(12) United States Patent
Wang et al.

(10) Patent No.: US 11,766,005 B2
(45) Date of Patent: Sep. 26, 2023

(54) IRRIGATION METHOD FOR COASTAL REGIONS

(71) Applicant: Nanjing Hydraulic Research Institute, Nanjing (CN)

(72) Inventors: Xiaojun Wang, Nanjing (CN); Feng Chen, Nanjing (CN); Jianyun Zhang, Nanjing (CN)

(73) Assignee: Nanjing Hydraulic Research Institute, Nanjing (CN)

( * ) Notice: Subject to any disclaimer, the term of this patent is extended or adjusted under 35 U.S.C. 154(b) by 0 days.

(21) Appl. No.: 18/066,192

(22) Filed: Dec. 14, 2022

(65) Prior Publication Data
US 2023/0115076 A1   Apr. 13, 2023

(30) Foreign Application Priority Data

Dec. 27, 2021   (CN) .......................... 202111617809.5

(51) Int. Cl.
| | |
|---|---|
| *A01G 25/16* | (2006.01) |
| *A01B 79/00* | (2006.01) |
| *G01W 1/14* | (2006.01) |

(52) U.S. Cl.
CPC ............ *A01G 25/16* (2013.01); *A01B 79/005* (2013.01); *G01W 1/14* (2013.01)

(58) Field of Classification Search
CPC .... A01G 25/16; A01G 25/023; A01B 79/005; G01W 1/14; Y02E 10/72; Y02E 10/728;
(Continued)

(56) References Cited

U.S. PATENT DOCUMENTS

2021/0368701 A1* 12/2021 Du ....................... A01B 79/005

FOREIGN PATENT DOCUMENTS

| CN | 1631098 A | 6/2005 |
|---|---|---|
| CN | 102254237 A | 11/2011 |

(Continued)

OTHER PUBLICATIONS

Xinyu Wan et al., "Multi-water Conjunction Allocation in Saline-alkaline Environment", Water Power, vol. 43, No. 5, pp. 30-32, 118.

*Primary Examiner* — Chad G Erdman

(57) ABSTRACT

An irrigation method for coastal regions. The method includes: selecting coastal region and collecting natural and environmental data of the coastal region; building a basic database of the coastal region based on high-precision map of the coastal region; establishing a water demand calculation model for coastal crops and a multi-source water supply model, where the multi-source water supply model includes a multi-source water of mixed salt-fresh water calculation model and a freshwater source calculation model; calculating water demand $Q_{demand}$ during a forecast period according to the water demand calculation model for coastal crops; clarifying salt content $S_{limit}$ of the water demand during the forecast period; calculating the water supply amount $Q_{supply}$ in the coastal region during the forecast period according to the multi-source water of mixed salt-fresh water calculation model; and comparing the $Q_{demand}$ and the $Q_{supply}$ to accordingly regulate irrigation operation.

3 Claims, 6 Drawing Sheets

(58) Field of Classification Search
CPC .......... Y02E 70/30; Y02P 60/12; Y02P 70/50; A01C 23/047; F03D 9/007; F03D 9/11; F03D 9/30

See application file for complete search history.

(56) References Cited

FOREIGN PATENT DOCUMENTS

| | | | |
|---|---|---|---|
| CN | 109685685 | A | 4/2019 |
| CN | 110725329 | A | 1/2020 |
| CN | 110852518 | A | 2/2020 |
| CN | 110889553 | A | 3/2020 |
| CN | 111401750 | A | 7/2020 |
| CN | 216753036 | U | 6/2022 |
| WO | 2012173042 | A1 | 12/2012 |

\* cited by examiner

IRRIGATION METHOD FOR COASTAL REGIONS

CROSS-REFERENCE TO RELATED APPLICATIONS

This application claims the benefit of priority from Chinese Patent Application No. 202111617809.5, filed on Dec. 27, 2021. The content of the aforementioned application, including any intervening amendments thereto, is incorporated herein by reference in its entirety.

TECHNICAL FIELD

This application relates to hydraulic engineering field, and more particularly to an irrigation method for coastal regions.

BACKGROUND

As a new field of modern agricultural development, seawater-irrigation agriculture has been carried out in China on a trial basis in nearly 300,000 hm² of coastal intertidal flats and waste saline-alkali areas in Shandong, Jiangsu, Guangdong, Hainan and other provinces. In China, saline-alkali tolerant rice has been studied since the 1850s, and the trial planting of seawater rice is in full swing at present. Rational planning and optimal allocation of the seawater rice in coastal saline-alkali areas can effectively save freshwater and promote the efficient utilization and sustainable development of water and soil. Although the seawater rice can fully use the seawater resources in coastal regions due to salt-alkali tolerance, the freshwater is required to dilute the salt. With the large-scale cultivation of the seawater rice, more energy and water resources are needed to ensure coastal agricultural production. Under the current situation of the increasingly severe contradiction between supply and demand of water resources and energy in coastal regions, it is urgently required to accurately measure the irrigation water demand of the crops, especially seawater rice, in coastal regions, and make full use of the salt water resources and freshwater resources to perform high-efficiency irrigation.

SUMMARY

An objective of this application is to provide an irrigation method for coastal regions to accurately measure the irrigation water demand of the crops, especially the seawater rice, in coastal regions, irrigate with mixed salt-fresh water, and realize the irrigation through relative assemblies such as irrigation canal assembly and control assembly.

Technical solutions of this application are described as follows.

In a first aspect, this application provides an irrigation method for coastal regions, comprising:

(S1) selecting coastal region and collecting natural and environmental data of the coastal region; and building a basic database of the coastal region based on high-precision map of the coastal region;

(S2) establishing a water demand calculation model for coastal crops and a multi-source water supply model, wherein the multi-source water supply model comprises a multi-source water of mixed salt-fresh water calculation model and a freshwater source calculation model;

the multi-source water of mixed salt-fresh water calculation model is expressed as follows:

$$S_{mixed} = \frac{S_1 \cdot Q_1 + S_2 \cdot Q_2 + S_3 \cdot Q_3 + \ldots + S_n \cdot Q_n}{Q_1 + Q_2 + Q_3 + \ldots + Q_n} \times 100\%;$$

wherein $Q_i = Z_i \times v_i$, where i is 1, 2, 3, ..., n; $S_{mixed}$ is a salt content of mixed salt-fresh water; $S_1, S_2, \ldots, S_n$ are salt contents of different salt-fresh water sources; $Q_1, Q_2, Q_3, \ldots, Q_n$ are the amounts of different salt-fresh water sources; $Z_i$ is a flow cross-section of an i-th irrigation-drainage canal; and $v_i$ is a flow speed of the i-th irrigation-drainage canal; and (S3) calculating a water demand $Q_{demand}$ during a forecast period according to the water demand calculation model for coastal crops; clarifying a salt content $S_{limit}$ of the water demand during the forecast period; calculating the water supply amount $Q_{supply}$ in the coastal region during the forecast period according to the multi-source water of mixed salt-fresh water calculation model; and comparing the $Q_{demand}$ and the $Q_{supply}$ to accordingly regulate irrigation operation.

In an embodiment, the freshwater source calculation model is expressed as follows:

$$Q_{freshwater} = Q_{rainfall} + Q_{reclaimed\ water} + Q_{diversion\ water} + Q_{groundwater},$$

wherein $Q_{rainfall} = \alpha \cdot I \cdot A$, $\alpha$ is a runoff coefficient; I is the amount of rainfall during the forecast period; A is a runoff gathering area, $Q_{reclaimed\ water}$ is the amount of reclaimed water; $Q_{diversion\ water}$ is the amount of freshwater by water diversion project; and $Q_{groundwater}$ is the amount of groundwater supply.

In an embodiment, a use priority of freshwater is as follows: $Q_{rainfall} > Q_{reclaimed\ water} > Q_{diversion\ water} > Q_{groundwater}$.

In an embodiment, an irrigation process comprises the following modes:

when $Q_{supply} = Q_{freshwater} = Q_{rainfall} \geq Q_{demand}$, the freshwater is sufficient to meet requirements of crop growth during the forecast period, and $h_{upper}$ or $\theta_{upper}$ is taken as limit index for stage crop; when a water level in field and a water content in soil are higher than $h_{upper}$ or $\theta_{upper}$, excess rainwater is drained into ditch, pond and water course around the field to be stored for use;

when $Q_{supply} = Q_{freshwater} = Q_{rainfall} + Q_{reclaimed\ water} \geq Q_{demand}$, the freshwater is sufficient to meet the requirements of crop growth during the forecast period, and $h_{upper}$ and $h_{lower}$ or $\theta_{upper}$ and $\theta_{lower}$ are taken as limit indexes for stage crop; when the water level in field and the water content in soil are higher than $h_{upper}$ or $\theta_{upper}$, excess freshwater is drained into ditch, pond and water course around the field to be stored for use; when the water level in field and the water content in soil are lower than $h_{lower}$ or $\theta_{lower}$, the field is irrigated according to water demand calculated by the water demand calculation model for coastal crops;

when $Q_{freshwater} = Q_{rainfall} + Q_{reclaimed\ water} < Q_{demand}$, the minimum amount $Q_{minimum\ diversion\ water}$ of the freshwater by water diversion project is calculated by the freshwater source calculation model and the multi-source water of mixed salt-fresh water calculation model; the $Q_{minimum\ diversion\ water}$ is no more than $(Q_{demand} - Q_{rainfall} - Q_{reclaimed\ water})$; $h_{lower}$ or $\delta_{lower}$ is taken as limit index for stage crop; and when the water level in field and the water content in soil are lower than $h_{lower}$ or $\delta_{lower}$, the field is irrigated according to the water demand calculated by the water demand calculation model for coastal crops; and when $Q_{freshwater} = Q_{rainfall} + Q_{reclaimed\ water} + Q_{diversion\ water} < Q_{demand}$, the minimum amount $Q_{minimum\ groundwater}$ of freshwater by groundwater supply is calculated according to the multi-source water of mixed salt-fresh water calculation model; $h_{lower}$ or $\theta_{lower}$ is taken as limit index for stage crop; and when the water level in field and the water content in soil are lower than $h_{lower}$ or $\theta_{lower}$, the field is irrigated according to the water demand calculated by the water demand calculation model for coastal crops;

wherein $h_{lower}$ is an upper threshold of the water level in field;

$\theta_{upper}$ is an upper threshold of the water content in soil;

$h_{lower}$ is a lower threshold of the water level in field; and $\theta_{lower}$ is a lower threshold of the water content in soil.

In an embodiment, the basic database comprises topographical data, soil data, meteorological and hydrological data, crop data, fresh water supplementation mode, groundwater level data and irrigation-drainage canal data.

In an embodiment, the water demand calculation model for coastal crops comprises:

$Q_{demand} = K_c \cdot ET_0$, wherein $ET_0$ is a reference crop water demand, and is calculated by Penman-Monteith equation; and $K_c$ is a crop coefficient;

or $Q_{demand} = h \cdot Z$, wherein Z is crop acreage in a field; $h = h_1 + P - S - \alpha \cdot E_0$, wherein $h_1$ is a depth of storage water in the field at beginning of the forecast period, and h is a depth of the storage water in the field at end of the forecast period; P is the amount of rainfall; S is the amount of water leakage in the field; $\alpha \cdot E_0$ is the amount of evaporation of the field; $E_0$ is the amount of evaporation from water surface; and $\alpha$ is a coefficient of crop water demand in each growth period;

or $Q_{demand} = h \cdot Z$, wherein Z is the crop acreage in the field; $h = h_1 + P - E$, wherein $h_1$ and h are water contents in soil; P is the amount of rainfall; and E is the amount of evaporation from land surface.

In a second aspect, this application provides an irrigation system for coastal regions, comprising:

water reservoirs;
a canal assembly;
a control assembly; and
an energy-supply assembly;

wherein the water reservoirs are provided spaced apart from high position on inland to low position in coastal regions;

the canal assembly comprises main canals and branch canals; two ends of each of the branch canals are respectively communicated with any one of the main canals; and two ends of any one of the main canals are respectively communicated with two adjacent water reservoirs;

the control assembly comprises detection assemblies, control gates, and water pumps; the detection assemblies are provided in the water reservoirs, and the canal assembly, respectively; the control gates are configured to control a communication state between the main canals and the branch canals, and/or a communication state between the main canals and the adjacent water reservoirs; and the water pumps are respectively provided in each of the water reservoirs; and the energy-supply assembly is electrically connected to the control assembly, and configured to regulate the control assembly in use.

In an embodiment, the energy-supply assembly comprises:

a casing body;
a storage battery;
a solar-energy assembly; and
a wind-energy assembly;

wherein the casing body is provided in the field; the storage battery is provided inside the casing body; the solar-energy assembly is provided at side of the casing body, and electrically connected to the storage battery; and the wind-energy assembly is provided on the casing body.

In an embodiment, the wind-energy assembly comprises:

a wind-energy generating member electrically connected to the storage battery;

an extendable-retractable member connected to the casing body; the extendable-retractable member is provided with a limitator configured to limit the wind-energy generating member.

In an embodiment, the system further comprises a nozzle assembly, wherein the nozzle assembly are communicated to the canal assembly, and are connected to the casing body; an upper end surface of a limiting box is a concave surface; the concave surface is provided with a through hole; and the through hole is communicated with the nozzle assembly.

In an embodiment, the water reservoirs are respectively connected to a fertilizer-storing member, wherein the fertilizer-storing member comprises a fertilizer-storing main body and a collecting member; the fertilizer-storing main body is connected to each of the water reservoirs; and the collecting member is connected to the fertilizer-storing main body, and configured to move biomass in the field to the fertilizer-storing main body.

Compared to the prior art, this application has the following beneficial effects.

With regard to the method provided herein, the water demand calculation model for coastal crops in coastal regions, multi-source water supply model and the multi-source water of mixed salt-fresh water calculation model unifies the water demand and the water supply in coastal regions to form high-efficiency method for using water in the coastal farmland regions, effectively decreasing the freshwater demand in the coastal agricultural production and alleviating the shortage of coastal freshwater resources. Through the irrigation method using mixed salt-fresh water, multiple water sources in coastal regions are fully used, and are subjected to regional and large-scale allocation management, which effectively use the unconventional water sources. The water supply and demand are forecast to make the mixed salt-fresh water irrigation in coastal regions more precise, and allow the repetitive and uncertain costs to be effectively reduced.

The irrigation system is capable of supplying stable and reliable irrigation water for crops, and provide strong guarantee for the normal growth of crops such as seawater rice in coastal regions. The energy-supply assembly in the system provided herein is convenient for portable installation, and suitable for various environments. In addition, the energy-supply assembly can make full use of the wind energy, solar energy, and thus the electric energy consumption and transmission line configuration are reduced.

BRIEF DESCRIPTION OF THE DRAWINGS

In order to clearly illustrate technical solutions in the embodiments provided herein, the accompanying drawings required by the description in the embodiments or the prior art will be introduced briefly. Obviously, the accompanying drawings described below are merely some embodiments of this application. For those ordinary skilled in the art, other accompanying drawings can also be obtained according to the following drawings without making any creative work.

Figure 1:
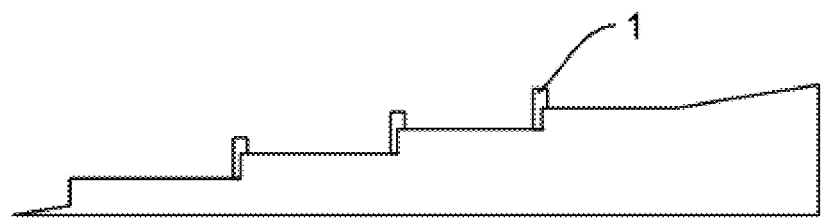
FIG. 1 is a schematic diagram of arrangement of field in irrigation system for coastal regions according to embodiment of this application.

In the drawings, 1, reservoirs; 2, canal assembly; 21, main canals; 22, branch canals; 3, control assembly; 31, detection assemblies; 32, control gates; 33, water pumps; 4, energy-supply assembly; 41, casing body; 42, storage battery; 43, solar-energy assembly; 44, wind-energy assembly; 441, extendable-retractable member; 442, wind-energy generating member; 4411, movable rod; 4412, limiting box; 4413, drive motor; 4414, rack slot; 443, limitator; 46, elastic base; 461, base; 47, movable plate; 462, elastic pipe; 5, nozzle assembly; 6, fertilizer-storing member; 61, fertilizer-storing main body; 62, collecting member.

DETAILED DESCRIPTION OF EMBODIMENTS

In order to clearly explain the technical problems, technical solutions and beneficial effects, this application will be further described in detail below with reference to the accompanying drawings and embodiments. It should be understood that the embodiments provided herein are merely illustrative of this application, but not intended to limit the application.

Figure 2:
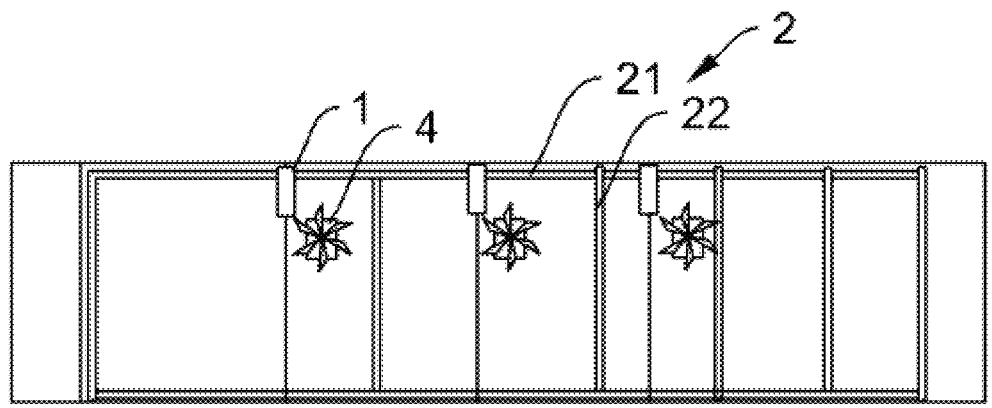
FIG. 2 is top view of connection between reservoirs and canal assembly in the irrigation system for coastal regions according to embodiment of this application.
Figure 3:
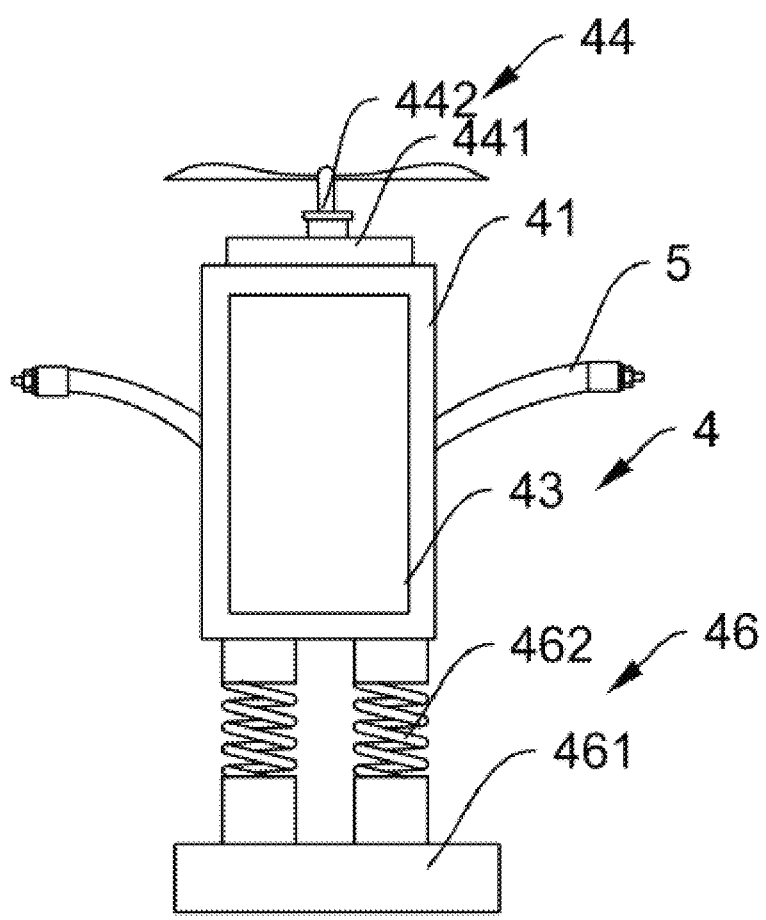
FIG. 3 is schematic diagram of an energy-supply assembly used in another irrigation system for coastal regions according to embodiment of this application.
Figure 4:
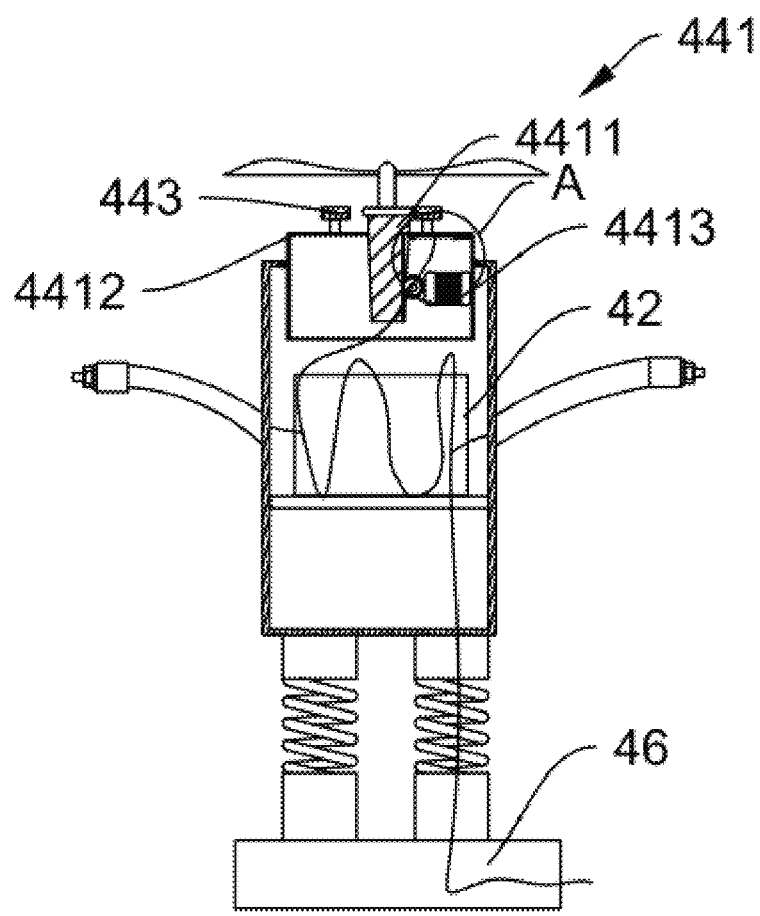
FIG. 4 is cross-sectional view of the energy-supply assembly used in another irrigation system for coastal regions according to embodiment of this application.
Figure 5:
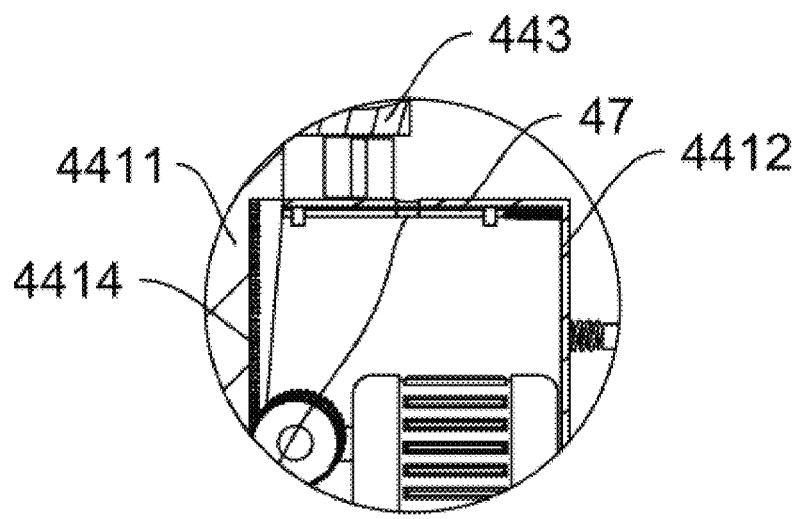
FIG. 5 is enlarged view of structure of part A in FIG. 4.
Figure 6:
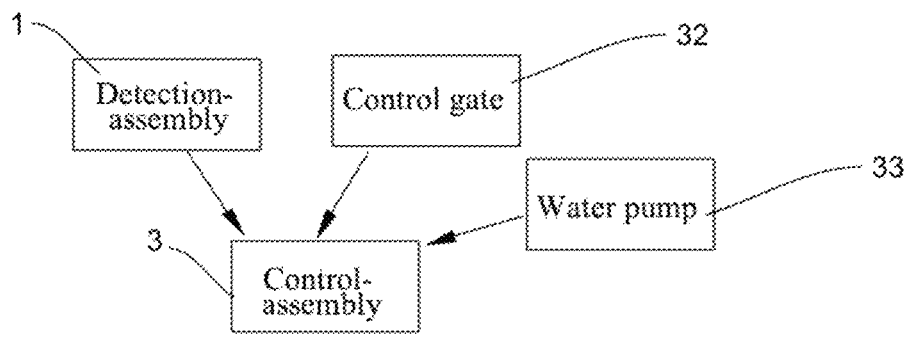
FIG. 6 is a block diagram of the energy-supply assembly used in another irrigation system for coastal regions according to embodiment of this application.
Figure 7:
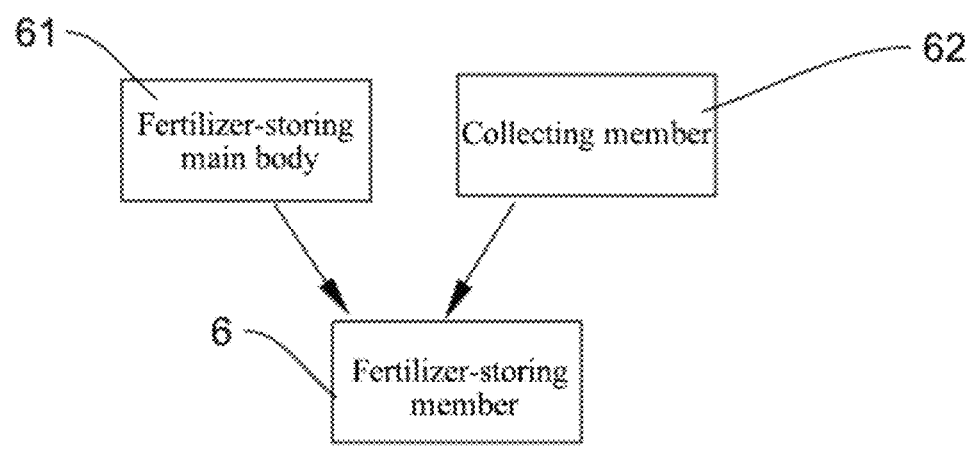
FIG. 7 is a block diagram of the fertilizer-storing member used in another irrigation system for coastal regions according to embodiment of this application.
Figure 8:
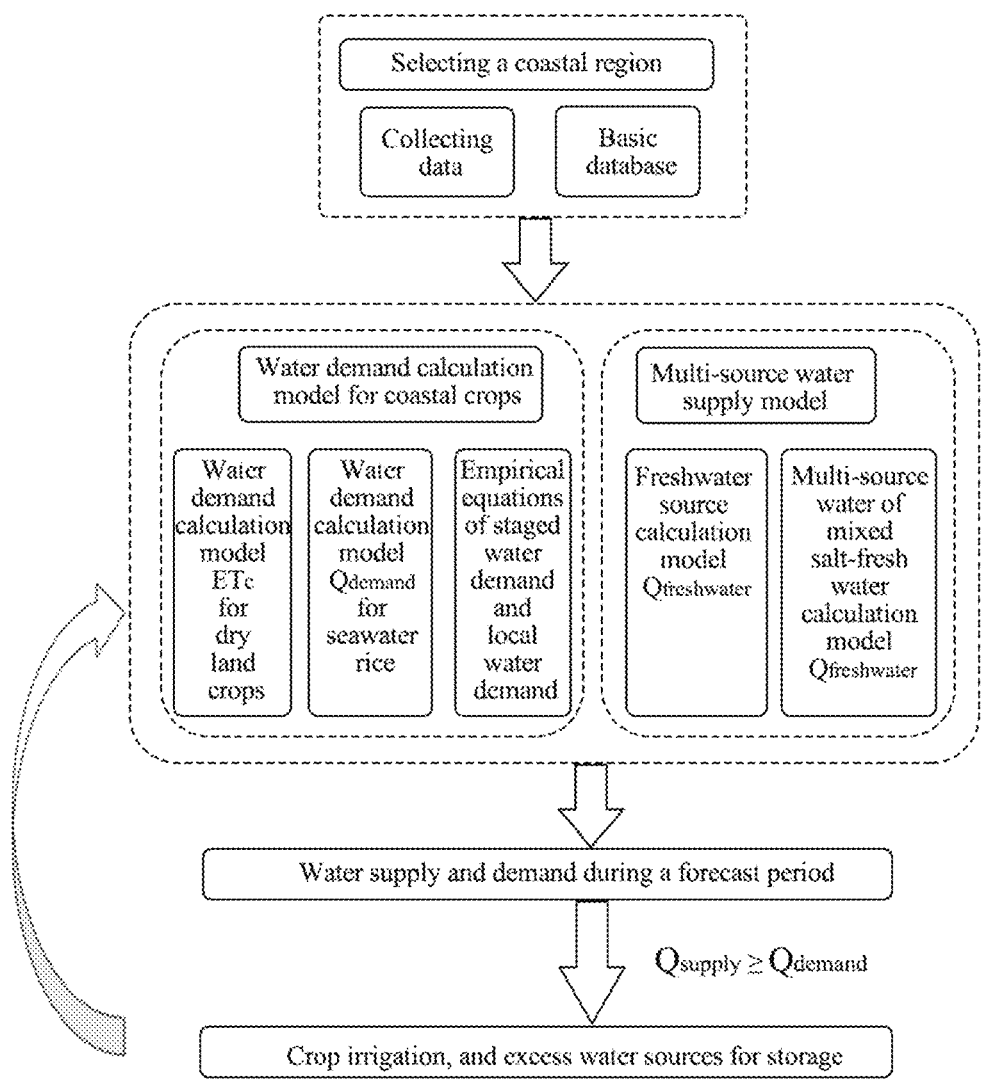
FIG. 8 is flowchart of irrigation method for coastal regions according to embodiment of this application.

Referring to embodiments shown in FIGS. 1-8, provided herein is an irrigation system for coastal regions. The system provided herein includes water reservoirs 1, a canal assembly 2, a control assembly 3, and an energy-supply assembly 4. The water reservoirs 1 are provided spaced apart from high position on inland to low position in coastal regions. The canal assembly 2 includes main canals 21 and branch canals 22. Two ends of each of the branch canals 22 are respectively communicated with any one of the main canals 21, and two ends of any one of the main canals 21 are respectively communicated with two adjacent water reservoirs 1. The control assembly 3 comprises detection assemblies 31, control gates 32, and water pumps 33. The detection assemblies 31 are provided in the water reservoirs 1, and the canal assembly 2, respectively. the control gates 32 are configured to control a communication state between the main canals 21 and the branch canals 22, and/or a communication state between the main canals 21 and the adjacent water reservoirs 1. The water pumps 33 are provided in the water reservoirs 1. The energy-supply assembly 4 is electrically connected to the control assembly 3, and configured to regulate the control assembly 3 in use.

In this embodiment, fields are arranged vertically in a stepped vertical pattern from inland to sea, where the fields are arranged from high to low. Slope ratio existing between the adjacent fields is 1/1000-1/500. Each soil step layer has thickness of 20-50 cm. The reservoirs 1 are respectively arranged between the adjacent fields, and the salt-fresh water are mixed in the reservoirs 1. After that, the mixed salt-freshwater in the reservoirs 1 flows into the main canals 21 and the branch canals 22, and then flows into each field. During the whole process, the detection assemblies 31 are configured to detect data such as water quality, water level, salinity, and flow rate. The control gates 32 are configured to control the communication state. The water pumps 33 are respectively arranged in each of the reservoirs 1, and configured to not only regulate water amount in each of the reservoirs 1, but also drain water to the main canals 21 and the branch canals 22, making full use of water sources inside the system. The energy-supply assembly 4 is arranged to realize automatic energy supply in the system provided herein.

This application provides the irrigation system for coastal regions. Compared with the prior art, the system provided herein can construct the system with high-efficiency utilization and management of water sources in coastal regions, and provide technical supports for arranging the production space in coastal regions.

In this embodiment, the water pump 33 provided in any one of the reservoirs 1 is communicated with another reservoir of the reservoirs 1 through a first pipeline. The water pump 33 provided in any one of the reservoirs 1 is communicated with the main canals 21 and/or the branch canals 22 through a second pipeline. Whether the water pump 33 is communicated with the first pipeline or the second pipeline is dependent on actual conditions.

In this embodiment, the water amount of each of the reservoirs 1 is set according to field control region. Each of the reservoirs 1 has depth of 2-10 m, and square or circular bottom, and area of the bottom is determined according to the local topographic conditions. Each of the reservoirs 1 is arranged between the adjacent two soil step layers, and configured to mix the sea water and the freshwater, undertake drainage of upper field, accumulate the irrigation water of lower field, and regulate the groundwater level.

In this embodiment, the branch canals 22 are arranged along the water flow direction, that is generally along the east-west direction from inland to sea. The main canals 21 are arranged along the north-south direction and perpendicular to the branch canals 22. Connecting surfaces between the main canals 21 and the branch canals 22 have trapezoidal shape, U-shape or trapezoidal shape with an arc bottom.

Referring to embodiments shown in FIGS. 1-8, the energy-supply assembly 4 includes a casing body 41, a storage battery 42, a first solar-energy assembly 43 and a wind-energy assembly 44. The casing body 41 is provided in the field. The storage battery 42 is arranged in the casing body 41. The first solar-energy assembly 43 is arranged on side of the casing body 41, and electrically connected to the storage battery 42. The wind-energy component 44 is provided on the casing body 41, and electrically connected to the storage battery 42. The casing body 41 is made of heat insulating material, and provided with an accommodating cavity to accommodate the storage battery 42. A heat-insulating coating is coated on wall of the accommodating cavity. The wind-energy assembly 44 is arranged on an upper end surface of the casing body 41. The energy-supply assembly 4 is configured to generate electricity by drawing upon the windy characteristic in coastal regions, which is environmentally friendly. The energy-supply assembly 4 is configured to generate electricity through various ways, which makes full use of natural sources, and improves the endurance of energy-supply assembly 4.

The energy-supply assembly 4 further includes an elastic base 46. The elastic base 46 is connected to a lower end surface of the casing body 41. One end of the elastic base 46 is embedded in the soil, and the other end of the elastic base 46 is connected to the casing body 41. The elastic base 46 includes a base 461 and an elastic pipe 462 connected to the base 461. The elastic pipe 462 includes a deformation spring. Two tubes are respectively provided at two ends of the deformation spring. One tube of the two tubes is connected to the base 461, and the other tube of the two tubes is connected to the casing body 41.

In this embodiment, the wind-energy assembly 44 includes a wind-energy generating member 442 and an extendable-retractable member 441. The wind-energy generating member 442 is electrically connected to the storage battery 42. The extendable-retractable member 441 is connected with the casing body 41. The extendable-retractable member 441 is provided with a limitator 443 to limit the position of the wind-energy generating member 442. The extendable-retractable member 441 is configured to not only drive wind-energy generating member 442 to move, but also limit the position of the wind-energy generating member 442 under certain conditions.

In this embodiment, the extendable-retractable member 441 includes a movable rod 4411, a limiting box 4412 and a drive motor 4413. The movable rod 4411 has structure of frustum of cone. A rack slot is provided at side of the movable rod 4411. The rack slot 4414 is axially provided around the movable rod 4411. One end of the movable rod 4411 is connected to the wind-energy generating member 442. The limiting box 4412 is provided with a first through hole. The movable rod 4411 is configured to pass through the first through hole. The drive motor 4413 is electrically connected to the storage battery 42, and engaged with the movable rod 4411 through gears. The drive motor 4413 is provided in the limiting box 4412.

In this embodiment, the wind-energy generating member 442 is elastically connected to the extendable-retractable member 441 through an elastic member. One end of the movable rod 4411 is provided with a connecting frame, and a buffer layer is attached to the connecting frame, and buffer springs are connected to the connection frame. The connecting frame is connected to the buffer springs. The wind-energy generating member 442 is connected with the buffer springs, the buffer layer, and the connecting frame, and the wind-energy generating member 442 is connected to the movable rod 4411. The elastic member is composed of the buffer springs, the buffer layer and the connecting frame. The elastic member is configured to buffer. The wind-energy generating member 442 is a direct-drive wind generator, which includes rotating blades. Shape of a limiting groove is configured to be matched with shape of the rotating blades.

The limitator 443 is composed of a limiting rod connected to a limiting box 4412 and the limiting groove provided at one end of the limiting rod away from the limiting box 4412. The drive motor 4413 is configured to drive the movable rod 4411 to move downward, so as to drive the wind-energy generating member 442 to move downward until the two rotating blades in the wind-energy generating member 442 are caught by the limiting groove. The limitator 443 is configured to limit the wind-energy generating member 442 under certain circumstances. When limited, the wind-energy generating member 442 is configured to be better matched with the limitator 443 by adjusting the position of the elastic member.

In this embodiment, the irrigation system further includes a nozzle assembly 5. The nozzle assembly 5 is communicated to the canal assembly 2, and connected to the casing body 41. An upper end surface of the limiting box 4412 is a concave surface. The concave surface is provided with a third through hole. The third through hole is communicated to the nozzle assembly 5. The nozzle assembly 5 is arranged in plural. Each nozzle assembly 5 is provided on the side of the casing body 41. The nozzle assembly includes a nozzle. One end of the nozzle is connected to the water pump 33 through a third pipeline, and the other end of the nozzle is a rod body at connecting end, and is connected to the connecting end of the rod body. The rod body is provided with a water-drawing member to spray water through the nozzle. The nozzle assembly 5 and the energy-supply assembly 4 are configured to form humanoid structure to drive the birds away. The concave surface is provided to conveniently collect the rainwater into the nozzle assembly 5.

In this embodiment, the concave surface is further provided with a filter screen. The filter screen is configured to cover the third through hole. The limiting box 4412 is slidably connected to a movable plate 47. The movable plate 47 is provided with a second through hole. Cross-section size of the second through hole is the same as that of the third through hole. Whether the third through hole is communicated with the external environment or not is determined by moving the movable plate 47. When the movable plate 47 is configured to cover the third through hole, the third through hole is not communicated to the external environment. When the second through hole of the movable plate 47 is overlapped with the third through hole, the third through hole is communicated to the external environment. The movable plate 47 is connected to the limiting box 4412 through a compression spring. The second through hole is communicated with the nozzle assembly 5 through a fourth pipeline. The fourth pipeline is communicated with the main canals 21 and/or the branch canals 22, and wound around the storage battery 42 along the circumferential direction, so as to cool the storage battery 42.

In this embodiment, the irrigation system further includes a second solar-energy assembly arranged on the main canals 21 or/and the branch canals 22. The second solar-energy assembly is electrically connected to the storage battery 42.

Referring to embodiments shown in FIGS. 1-8, each of the reservoirs 1 is connected to a fertilizer-storing member 6. The fertilizer-storing member 6 includes a fertilizer-storing main body 61 and a collecting member 62. The fertilizer-storing main body 61 is connected to each of the water reservoirs 1. The collecting member 62 is connected to the fertilizer-storing main body 61, and configured to move biomass in the field to the fertilizer-storing main body 61.

This application provides an irrigation method for coastal regions. The method provided herein is performed as follows.

(SS1) Coastal region is selected and natural and environmental data of the coastal region is collected. A basic database of the coastal region is built based on high-precision map of the coastal region. The basic database includes topographical data, soil data (such as soil type, salt content in soil, soil bulk density, water-holding characteristics, organic content, etc.), meteorological and hydrological data (such as salt content in water quality, groundwater level and salt content, river system, temperature and humidity, the amount of rainfall, wind speed, radiation, sunshine, etc.), crop data (such as crop species, crop growth stage, crop land area, planting mode), fresh water supplementation mode and irrigation-drainage canal data. The basic database is classified and stored to form an open database, which can be supplied and adjusted according to the actual situation.

(SS2) A water demand calculation model for coastal crops and a multi-source water supply model for coastal crops are established, where the multi-source water supply model includes a multi-source water of mixed salt-fresh water calculation model and a freshwater source calculation model.

A water demand calculation model library for coastal crops is provided. According to the water demand of the crops (represented by seawater rice and *Sesbania cannabina*) in coastal regions, the water demand calculation model library for coastal crops includes two kinds of water demand calculation models, which are expressed as follows.

(1) The water demand calculation model for coastal crops (dry land crop, *Sesbania cannabina*) recommended by the United Nations Food and Agriculture Organization (FAO), which is expressed as $Q_{demand}=ET_c=K_c \cdot ET_0$, where $ET_0$ is a reference crop water demand, and is calculated by Penman-Monteith equation, $K_c$ is a crop coefficient, and $ET_C$ is an actual reference crop water demand.

(2) A calculation of the water demand of crop (sea rice, etc.) is expressed as $Q_{demand}=h \cdot Z$, where $Q_{demand}$ is a water demand of crop; Z is crop acreage in the field; $h=h_1+P-S-\alpha \cdot E_0$, where $h_1$ is a depth of storage water in the field at beginning of the forecast period, and h is a depth of the storage water in the field at end of the forecast period; P is the amount of rainfall; S is the amount of water leakage in the field; $\alpha \cdot E_0$ is the amount of evaporation of the field; $E_0$ is the amount of evaporation from water surface; and $\alpha$ is a coefficient of crop water demand in each growth period. $Q_{demand}=h \cdot Z$, where Z is the crop acreage in the field; $h=h_1+P-E$, where $h_1$ and h are water contents in soil; P is the amount of rainfall; and E is the amount of evaporation from land surface.

In the water demand calculation model library for coastal crops, the water demand calculation model for coastal crops, such as empirical equations of staged water demand and local water demand, can be supplemented as required.

Multi-source water supply is mainly the amount of water available for crop irrigation, where freshwater sources are rainfall, reclaimed water, diversion water and groundwater. Salt water with salt content exceeding the salt content tolerated by crops is usually seawater.

The multi-source water of mixed salt-fresh water calculation model is expressed as follows.

$$S_{mixed} = \frac{S_1 \cdot Q_1 + S_2 \cdot Q_2 + S_3 \cdot Q_3 + \ldots + S_n \cdot Q_n}{Q_1 + Q_2 + Q_3 + \ldots + Q_n} \times 100\%;$$

where $Q_i=Z_i \times v_i$, where i is 1, 2, 3, ..., n; $S_{mixed}$ is a salt content of mixed salt-fresh water; $S_1, S_2, \ldots, S_n$ are salt contents of different salt-fresh water sources; $Q_1, Q_2, Q_3, \ldots, Q_n$ are the amounts of different salt-fresh water sources; $Z_i$ is a flow cross-section of an i-th irrigation-drainage canal; and $v_i$ is a flow speed of the i-th irrigation-drainage canal.

The freshwater source calculation model is expressed as follows:

$Q_{freshwater}=Q_{rainfall}+Q_{reclaimed\ water}+Q_{diversion\ water}+Q_{groundwater}$;

where $Q_{rainfall}=\alpha \cdot I \cdot A$, $\alpha$ is a runoff coefficient, I is the amount of rainfall during the forecast period, A is a runoff gathering area, $Q_{reclaimed\ water}$ is the amount of reclaimed water. In this embodiment, if water quality of the drainage water from upper layer of the field meets the requirements, the drainage water can be irrigation water source to the next layer of the field, which makes full use of the water sources. $Q_{diversion\ water}$ is the amount of freshwater by water diversion project, and $Q_{groundwater}$ is the amount of groundwater supply.

A use priority of freshwater is as follows: $Q_{rainfall} > Q_{reclaimed\ water} > Q_{diversion\ water} > Q_{groundwater}$.

(SS3) The water demand $Q_{demand}$ during the forecast period is calculated according to the water demand calculation model for coastal crops. The salt content $S_{limit}$ of the water demand during the forecast period is clarified. The water supply amount $Q_{supply}$ in the coastal region during the forecast period is calculated according to the multi-source water of mixed salt-fresh water calculation model. By comparing data size of the $Q_{demand}$ and the $Q_{supply}$, irrigation operation is regulated.

The step (SS3) is performed as follows.

A coastal region is selected, and the basic database is introduced into the water demand calculation model for coastal crops according to crop growth stages, so as to obtain the water demand $Q_{demand}$ in the forecast period, and clarify the salt content $S_{limit}$ of the water demand during the forecast period. The control indexes of crops, such as seawater rice, are $h_{upper}$, $h_{middle}$, $h_{lower}$, and the corresponding water demands are $Q_{upper}$, $Q_{middle}$, $Q_{lower}$. The control indexes of the dry land crops are $\theta_{upper}$, $\theta_{middle}$, and $\theta_{lower}$, and the corresponding water demands are $Q_{upper}$, $Q_{middle}$, and $Q_{lower}$.

According to weather and rainfall forecast data, groundwater level and salt content data, river system data, freshwater supplementation and irrigation-drainage canal data, the water supply amount $Q_{supply}$ in the coastal region during the forecast period is calculated using the multi-source water of mixed salt-fresh water calculation model. According to the $Q_{supply}$, the irrigation control modes are as follows.

An irrigation process includes the following modes.

When $Q_{supply}=Q_{freshwater}=Q_{rainfall} \geq Q_{demand}$, the freshwater is sufficient to meet requirements of crop growth during the forecast period, and $h_{upper}$ or $\theta_{upper}$ is taken as limit index for stage crop; when a water level in field and a water content in soil are higher than $h_{upper}$ or $\theta_{upper}$, excess rainwater is drained into ditch, pond and water course around the field to be stored for use.

When $Q_{supply}=Q_{freshwater}=Q_{rainfall}+Q_{reclaimed\ water} \geq Q_{demand}$, the freshwater is sufficient to meet the requirements of crop growth during the forecast period, and $h_{upper}$ and $h_{lower}$ or $\theta_{upper}$ and $\theta_{lower}$ are taken as limit indexes for stage crop; when the water level in field and the water content in soil are higher than $h_{upper}$ or $\theta_{upper}$, excess freshwater is drained into ditch, pond and water course around the field to be stored for use. When the water level in field and the water content in soil are lower than $h_{lower}$ or $\theta_{lower}$, the field is irrigated according to water demand calculated by the water demand calculation model for coastal crops.

When $Q_{freshwater}=Q_{rainfall}+Q_{reclaimed\ water}<Q_{demand}$, the minimum amount $Q_{minimum\ diversion\ water}$ of the freshwater by water diversion project is calculated by the freshwater source calculation model and the multi-source water of mixed salt-fresh water calculation model. The $Q_{minimum\ diversion\ water}$ is no more than $(Q_{demand}-Q_{rainfall}-Q_{reclaimed\ water})$. $h_{lower}$ or $\theta_{lower}$ is taken as limit index for stage crop. When the water level in field and the water content in soil are lower than $h_{lower}$ or $\theta_{lower}$, the field is irrigated according to the water demand calculated by the water demand calculation model for coastal crops.

When $Q_{freshwater} = Q_{rainfall} + Q_{reclaimed\ water} + Q_{diversion\ water} < Q_{demand}$, the minimum amount $Q_{minimum\ groundwater}$ of freshwater by groundwater supply is calculated according to the multi-source water of mixed salt-fresh water calculation model. $h_{lower}$ or $\theta_{lower}$ is taken as limit index for stage crop. When the water level in field and the water content in soil are lower than $h_{lower}$ or $\theta_{lower}$, the field is irrigated according to the water demand calculated by the water demand calculation model for coastal crops, where $h_{lower}$ is an upper threshold of the water level in field; $\theta_{upper}$ is an upper threshold of the water content in soil; $h_{lower}$ is a lower threshold of the water level in field; and $\theta_{lower}$ is a lower threshold of the water content in soil.

An objective of this application is to provide the irrigation method for coastal regions, so as to not only accurately measure the irrigation water amount of crops, especially the seawater rice, in coastal regions, but also improve the desalination of saline-alkali areas through regulations.

The above-mentioned four irrigation control modes can realize high-efficiency utilization of the local conventional and unconventional water sources during crop growth in coastal regions. In the method provided herein, the water demand calculation model for coastal crops, multi-source water supply model and the multi-source water of mixed salt-fresh water calculation model unifies the water demand and the water supply in coastal regions to form the high-efficiency method for using water in coastal regions, effectively decreasing the freshwater demand in the coastal agricultural production and alleviating the shortage of coastal freshwater sources. Through the irrigation method using mixed salt-fresh water, multiple water sources in coastal regions are fully used, and are subjected to regional and large-scale allocation management, which effectively use the unconventional water sources. The water supply and demand are forecast to make the mixed salt-fresh water irrigation in coastal regions more precise, and allow the repetitive and uncertain costs to be effectively reduced.

This application provides another irrigation method for coastal regions. Referring to embodiments shown in FIGS. 1-7, another irrigation method for coastal regions is performed as follows:

(1) Coastal region is selected and natural and environmental data of the coastal region is collected. Arrangement of the mixed salt-fresh water irrigation system of the coastal region is built based on high-precision map of the coastal region, where the arrangement includes arrangement of the fields, arrangement of the canals, arrangement of the reservoirs 1, water supplementation modes and position of the control assembly.

The natural and environmental data includes meteorological and hydrological data, terrain elevation data and other data, mainly including local rainfall, regional water system, and vegetation species.

The arrangement of the fields includes vertical arrangement of the fields, and terraced fields from inland to sea. The soil step layer in each layer of the terraced fields has height of 20-50 cm. Slope ratio i between the two adjacent layers of the terraced fields is 0.001-0.002.

The arrangement of the canals includes that the irrigation canals and the drainage canals are common, and arranged from inland to sea. The reservoirs 1 are arranged between the two soil step layers. The reservoirs 1 have depth of 2-10 m.

The arrangement of the water supplementation mode includes that the freshwater sources are rainwater, reclaimed water, diversion water, and groundwater; salt water is seawater, and average salt content of seawater is 0.35%. The control threshold of the mixed salt-fresh water is 10% of the seawater, that is 0.035%. When the salt content in the salt-fresh water is determined, the demand ratio of salt water to the freshwater in the mixed salt-fresh water is calculated by the mixing ratio of the salt water to the freshwater according to the mixed salt-fresh water calculation model.

The field needs to be fertilized in the reservoirs 1. The fertilizer as required is mixed with water in the reservoirs 1 in proportion. The fields are comprehensively and precisely fertilized by cooperation of the control gates 32 and the water pumps 33.

(2) Key index data of crops during crop growth is calculated, such that a crop growth database is established. The crop growth database includes a basic data model, a mixed salt-fresh water model and a water-fertilizer transfer model. The crop growth database is electrically connected to the control assembly 3.

After that, the crop growth database is checked at regular intervals to ensure that the pipelines and ditches are unobstructed and the device is operating normally.

(3) During the irrigation, the control assembly 3 continuously corrects the allocation result according to real-time monitoring data. The detection data includes one or more of real-time salinity data, water supply data and water demand data. The control assembly 3 corrects the allocation result according to the mixed salt-fresh water calculation equation and the freshwater supplementation calculation equation.

When the irrigation system is operating, the weather forecast is introduced into the basic data model. The crop growth database will calculate and analyze using the mixed salt-fresh water calculation equation based on the irrigation water demand and irrigation water quality in the fields to clarify the demand ratio of the salt water to the freshwater and the demand of the salt-fresh water. Then, the water demand of the salt water and the water demand of the freshwater are calculated according to the freshwater supplementation calculation equation, and the salt water and the freshwater is introduced to the reservoirs 1 for mixing to obtain mixed salt-fresh water. The salt-fresh water is distributed to each field in time according to the principle of proximity.

The mixed salt-fresh water calculation equation is expressed as follows:

$$S_{mixed} = \frac{S_1 \cdot Q_1 + S_2 \cdot Q_2 + S_3 \cdot Q_3 + \ldots + S_n \cdot Q_n}{Q_1 + Q_2 + Q_3 + \ldots + Q_n} \times 100\%;$$

where $Q_i = Z_i \times v_i$, where i is 1, 2, 3, ..., n; $S_{mixed}$ is a salt content of mixed salt-fresh water; $S_1, S_2, \ldots, S_n$ are salt contents of different salt-fresh water sources; $Q_1, Q_2, Q_3, \ldots, Q_n$ are the amounts of different salt-fresh water sources; $Z_i$ is a flow cross-section of an i-th irrigation-drainage canal; and $v_i$ is a flow speed of the i-th irrigation-drainage canal;

The freshwater supplementation calculation equation is expressed as follows:

$$Q_{freshwater} = Q_{rainfall} + Q_{reclaimed\ water} + Q_{diversion\ water} + Q_{groundwater};$$

where $Q_{rainfall} = \alpha \cdot I \cdot A$, $\alpha$ is a runoff coefficient; I is the amount of rainfall during the forecast period; A is a runoff gathering area, $Q_{reclaimed\ water}$ is the amount of reclaimed water; $Q_{diversion\ water}$ is the amount of freshwater by water diversion project; and $Q_{groundwater}$ is the amount of groundwater supply. When $Q_{rainfall}+Q_{reclaimed\ water}>Q_{demand}$, $Q_{demand}$ is irrigation water demand in the fields.

The detection assemblies 31 (including water quality sensors, water level sensors and salt content sensors and flow speed detectors) and the control gates 32 are provided in the water reservoirs 1, and at inlets and outlets of the irrigation canals. The control gates 32 are arranged at inlets and outlets of the reservoirs 1. The water quality sensors and salt content sensors are arranged inside and outside the control gates 32, and the water level sensors are arranged in middle or on walls of the reservoirs 1, where the flow is relatively stable. The salt content sensors are configured to perform real-time monitoring on the salt content at the fixed point. The flow speed detectors are configured to measure the flow speed, so as to control the water inflow and the water outflow. The water pumps 33 are provided in the reservoirs 1, and configured to regulate the reservoirs provided at lower place to transfer water to the reservoirs provided at higher place and drain water out, so as to effectively use the local water sources. The basic database and a control database are built to deploy a salt-fresh water irrigation-drainage system.

The energy-supply assembly 4 is arranged near the reservoirs 1. A protective cover is provided on the energy-supply assembly 4.

Regarding the method provided herein, the water demand calculation model for coastal crops, the multi-source water supply model and the multi-source water of mixed salt-fresh water calculation model unifies the water demand and the water supply in coastal regions to form high-efficiency method for using water in coastal regions, effectively decreasing the freshwater demand in the coastal agricultural production and alleviating the shortage of coastal freshwater resources. Through the irrigation method using mixed salt-fresh water, multiple water sources in coastal regions are fully used, and are subjected to regional and large-scale allocation management, which effectively use the unconventional water sources. The water supply and demand are forecast to make the mixed salt-fresh water irrigation in coastal regions more precise, and allow the repetitive and uncertain costs to be effectively reduced. The irrigation system is capable of supplying stable and reliable irrigation water for crops, and provide strong guarantee for normal growth of crops such as seawater rice in coastal regions. The energy-supply assembly in the system provided herein is convenient for portable installation, and suitable for various environments. In addition, the energy-supply assembly can make full use of the wind energy, solar energy, and thus the electric energy consumption and transmission line configuration are reduced.

Described above are merely preferred embodiments of this application, which are not intended to limit this application. Any modifications, replacements or improvements made by those skilled in the art without departing from the spirit and scope of the application should fall within the scope of the application defined by the appended claims.

What is claimed is:

1. An irrigation method for coastal regions, comprising:
(S1) selecting coastal region and collecting natural and environmental data of the coastal region; and building a basic database of the coastal region based on high-precision map of the coastal region;
(S2) establishing a water demand calculation model for coastal crops and a multi-source water supply model, wherein the multi-source water supply model comprises a multi-source water of mixed salt-fresh water calculation model and a freshwater source calculation model; and the multi-source water supply model is configured for calculation and controlling of a salt content of mixed irrigation water;
the multi-source water of mixed salt-fresh water calculation model is expressed as follows:

$$S_{mixed} = \frac{S_1 \cdot Q_1 + S_2 \cdot Q_2 + S_3 \cdot Q_3 + \ldots + S_n \cdot Q_n}{Q_1 + Q_2 + Q_3 + \ldots + Q_n} \times 100\%;$$

wherein $Q_i = Z_i \times v_i$, where i is 1, 2, 3, ..., n; $S_{mixed}$ is a salt content of mixed salt-fresh water; $S_1, S_2, \ldots, S_n$ are salt contents of different salt-fresh water sources; $Q_1, Q_2, Q_3, \ldots, Q_n$ are the amounts of different salt-fresh water sources; $Z_i$ is a flow cross-section of an i-th irrigation-drainage canal; and $v_i$ is a flow speed of the i-th irrigation-drainage canal; and (S3) calculating a water demand $Q_{demand}$ during a forecast period according to the water demand calculation model for coastal crops; calculating a water supply amount $Q_{supply}$ in the coastal region during the forecast period according to the multi-source water of mixed salt-fresh water calculation model; and comparing the $Q_{demand}$ and the $Q_{supply}$ to accordingly regulate irrigation operation;

the water demand calculation model for coastal crops comprises:

$Q_{demand}=K_c \cdot ET_0 Q_{demand}=K_c \cdot ET_0$, wherein $ET_0$ is a reference crop water demand, and is calculated by Penman-Monteith equation; and $K_c$ is a crop coefficient;

or $Q_{demand}=h \cdot Z Q_{demand}=h \cdot Z$, wherein Z is crop acreage in a field; $h=h_1+P-S-\alpha \cdot E_0 h=h_1+P-S-\alpha \cdot E_0$, wherein $h_1$ is a depth of storage water in the field at beginning of the forecast period, and h is a depth of the storage water in the field at end of the forecast period; P is the amount of rainfall; S is the amount of water leakage in the field; $\alpha \cdot E_0$ is the amount of evaporation of the field; $E_0$ is the amount of evaporation from water surface; and a is a coefficient of crop water demand in each growth period;

or $Q_{demand}=h \cdot Z Q_{demand}=h \cdot Z$, wherein Z is the crop acreage in the field; $h=h_1+P-E$ $h=h_1+P-E$, wherein P is the amount of rainfall; and E is the amount of evaporation from land surface;

the freshwater source calculation model is expressed as follows:

$$Q_{freshwater}=Q_{rainfall}+Q_{reclaimed\ water}+Q_{diversion\ water}+Q_{groundwater}; Q_{freshwater}=Q_{rainfall}+Q_{reclaimed\ water}+Q_{diversion\ water}+Q_{groundwater}$$

wherein $Q_{rainfall}=\alpha \cdot I \cdot A$, is a runoff coefficient; I is the amount of rainfall during the forecast period; A is a runoff gathering area, $Q_{reclaimed\ water}$ is the amount of reclaimed water; $Q_{diversion\ water}$ is the amount of freshwater by water diversion project; and $Q_{groundwater}$ is the amount of groundwater supply;

an irrigation process comprises the following modes:

when $Q_{supply}=Q_{freshwater}=Q_{rainfall} \leq Q_{demand}$ $Q_{supply}=Q_{freshwater}=Q_{rainfall} \leq Q_{demand}$, the freshwater is sufficient to meet requirements of crop growth during the forecast period, and $h_{upper}$ or $\theta_{upper}$ is taken as limit index for stage crop; when a water level in field and a water content in soil are higher than $h_{upper}$ or $\theta_{upper}$, excess rainwater is drained into ditch, pond and water course around the field to be stored for use;

when $Q_{supply}=Q_{freshwater}=Q_{rainfall}\ Q_{reclaimed\ water} \geq Q_{demand}$ $Q_{supply}=Q_{freshwater}=Q_{rainfall}+Q_{reclaimed\ water} \geq Q_{demand}$, the freshwater is sufficient to meet the requirements of crop growth during the forecast period, and $h_{upper}$ and $h_{lower}$ or $\theta_{upper}$ and $\theta_{lower}$ are taken as control indexes according to crop growth stages; when the water level in field and the water content in soil are higher than $h_{upper}$ or $\theta_{upper}$, excess freshwater is drained into ditch, pond and water course around the field to be stored for use; when the water level in field and the water content in soil are lower than $h_{lower}$ or $\theta_{lower}$, the field is irrigated according to water demand calculated by the water demand calculation model for coastal crops;

when $Q_{freshwater} = Q_{rainfall} + Q_{reclaimed\ water} < Q_{demand}$ $Q_{freshwater} = Q_{rainfall} + Q_{reclaimed\ water} < Q_{demand}$, a minimum amount $Q_{minimum\ diversion\ water}$ of the freshwater by water diversion project is calculated by the freshwater source calculation model and the multi-source water of mixed salt-fresh water calculation model; the $Q_{minimum\ diversion\ water}$ is no more than ($Q_{demand} - Q_{rainfall} - Q_{reclaimed\ water}$) + $Q_{demand} - Q_{rainfall} - Q_{reclaimed\ water}$); $h_{lower}$ or $\theta_{lower}$ is taken as limit index for stage crop; and when the water level in field and the water content in soil are lower than $h_{lower}$ or $\theta_{lower}$, the field is irrigated according to the water demand calculated by the water demand calculation model for coastal crops; and when $Q_{freshwater} = Q_{rainfall} + Q_{reclaimed\ water} + Q_{diversion\ water} < Q_{demand}$ $Q_{freshwater} = Q_{rainfall} + Q_{reclaimed\ water} + Q_{diversion\ water} < Q_{demand}$, a minimum amount $Q_{minimum\ groundwater}$ of freshwater by groundwater supply is calculated according to the multi-source water of mixed salt-fresh water calculation model; $h_{lower}$ or $\theta_{lower}$ is taken as limit index for stage crop; and when the water level in field and the water content in soil are lower than $h_{lower}$ or $\theta_{lower}$, the field is irrigated according to the water demand calculated by the water demand calculation model for coastal crops;

wherein $h_{upper}$ is an upper threshold of the water level in field;

$\theta_{upper}$ is an upper threshold of the water content in soil;

$h_{lower}$ is a lower threshold of the water level in field; and $\theta_{lower}$ is a lower threshold of the water content in soil.

2. The irrigation method of claim 1, wherein a use priority of freshwater is as follows: $Q_{rainfall} > Q_{reclaimed\ water} > Q_{diversion\ water} > Q_{groundwater}$.

3. The irrigation method of claim 1, wherein the basic database comprises topographical data, soil data, meteorological and hydrological data, crop data, fresh water supplementation mode, groundwater level data and irrigation-drainage canal data.

* * * * *